United States Patent [19]

Ozaki

[11] Patent Number: 4,889,081
[45] Date of Patent: Dec. 26, 1989

[54] VEHICLE SUCTION SYSTEM
[75] Inventor: Tadayuki Ozaki, Shizuoka, Japan
[73] Assignee: Suzuki Jidosha Kogyo Kabushiki Kaisha, Shizuoka, Japan
[21] Appl. No.: 345,465
[22] Filed: Apr. 28, 1989
[30] Foreign Application Priority Data May 23, 1988 [JP] Japan .............................. 63-67907[U]

[51] Int. Cl.⁴ .......................................... F02M 35/10
[52] U.S. Cl. ................................................ 123/52 M
[58] Field of Search ........ 123/52 M, 52 MV, 52 ML, 123/52 MC, 52 MB, 52 MF

[56] References Cited

U.S. PATENT DOCUMENTS

| 2,017,043 | 10/1935 | Galliot | 123/52 MC |
| 3,735,744 | 5/1973 | Brody et al. | 123/52 M |
| 4,375,204 | 3/1983 | Yamamoto | 123/52 M |
| 4,422,416 | 12/1983 | Bernardoni | 123/52 MF |
| 4,807,570 | 2/1989 | Ruffolo | 123/52 MB |

FOREIGN PATENT DOCUMENTS

| 3617759 | 12/1986 | Fed. Rep. of Germany | 123/52 MB |
| 0138151 | 6/1988 | Japan | 123/52 M |
| 0205454 | 8/1988 | Japan | 123/52 M |
| 283224 | 1/1929 | United Kingdom | 123/52 MV |

*Primary Examiner*—David A. Okonsky
*Attorney, Agent, or Firm*—Flynn, Thiel, Boutell & Tanis

[57] ABSTRACT

A vehicle suction system for reducing the turbulence and pulsation of air flow to an internal combustion engine. A rectifying unit is installed in an air intake passageway of the vehicle suction system so that all air flow through the passageway flows through a face of the rectifying unit. The rectifying unit has a plurality of wedge-shaped partitions alternatingly, inversely disposed in the face of the rectifying unit and separating a plurality of square-shaped holes.

4 Claims, 2 Drawing Sheets

VEHICLE SUCTION SYSTEM

FIELD OF THE INVENTION

This invention relates to an improved vehicle suction system for rectifying the pulsation and turbulence of suction air, inhibiting air suction noises from being propagated to the air cleaner, preventing the suction-air-passage assembly from vibrating, and decreasing noises inside and outside the vehicle.

BACKGROUND OF THE INVENTION

FIG. 5 shows a conventional suction system for supplying suction air to an internal combustion engine for a vehicle. In the drawing, 2 represents an internal combustion engine, 4 an air cleaner, 6 a suction air duct, 8 a suction air case, 10 a carburetor, and 12 an intake manifold. A filter element 16 is installed in the air cleaner case 14 of the air cleaner 4. The air taken into the air cleaner case 14 through the filter element 16 passes through the suction air duct 6, a component of the suction air passage, and the suction air passage 18 of the suction air case 8, and is mixed with fuel in the carburetor 10 to produce an air-fuel mixture which is supplied to each combustion chamber (not illustrated) of the internal combustion engine 2 by the intake manifold 12. The above suction system is disclosed in Japanese Publications Nos. 62-14162 and 62-171657. The suction system disclosed in the former publication is designed so that the inside diameter of the suction air passage will be changed according to the suction air temperature, while that disclosed in the latter publication is equipped with a rectifying unit to rectify turbulence of suction air at the joint between the air cleaner and the suction air duct and with a mesh cover o covering the upstream side of the above rectifying unit.

In the conventional vehicle suction system, however, there is a problem of making the driver feel uncomfortable because the suction air duct is vibrated due to the pulsation or turbulence of suction air to produce air suction noises which leak from the air cleaner to the outside and increase the noises inside and outside the vehicle. Therefore, a resonator is conventionally installed in the suction air passage to decrease noises inside and outside the vehicle by muffling air suction noises. However, the resonator does not adequately decrease the noises because it cannot rectify the pulsation and turbulence of suction air or inhibit air suction noises from being propagated to the air cleaner. The resonator also has the disadvantage that it can easily be incorrectly installed because the proper installation direction is difficult to determine by the appearance of the resonator and the weight of the resonator makes it difficult to handle.

SUMMARY OF THE INVENTION

The purpose of the present invention is to provide a vehicle suction system capable of rectifying the pulsation and turbulence of suction air, inhibiting air suction noises from being propagated to the air cleaner, thereby preventing the suction-air-passage assembly from vibrating and the rectifying unit from being incorrectly installed in the suction-air-passage assembly, and making the system lightweight.

To accomplish the above purpose, the present invention has a rectifying unit with a plurality of through-holes facing the suction air flow direction separated by partitions and installed in the suction air passage in the suction-air-passage assembly of an internal combustion engine for a vehicle. The partitions face the suction air flow direction and have wedge-like cross sections alternatingly, inversely oriented to the suction air flow direction.

The configuration of the present invention makes it possible to rectify the pulsation and turbulence of suction air and inhibit air suction noises from being propagated to the air cleaner, and to install the rectifying unit in the suction-air-passage assembly without restriction on the installation direction by providing a plurality of throughholes along the suction air flow direction which are separated by partitions in the rectifying unit, which partitions face the suction air flow direction have wedge-like cross sections alternatingly, inversely oriented to the suction air flow direction.

DETAILED DESCRIPTION

Figure 1:
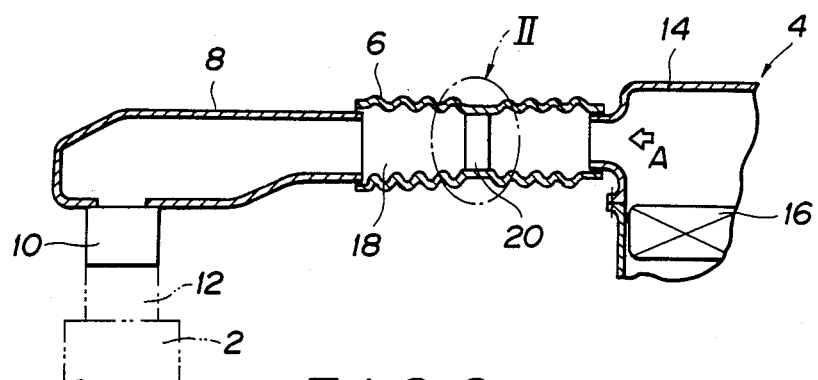
FIG. 1 is a cross-sectional view of the inventive vehicle suction system.

FIGS. 1 through 4 show a preferred embodiment of the suction air passage according to the present invention. In FIG. 1, 2 represents the internal combustion engine, 4 the air cleaner, 6 the suction air duct, 8 the suction air case, 10 the carburetor, and 12 the intake manifold.

Figure 2:
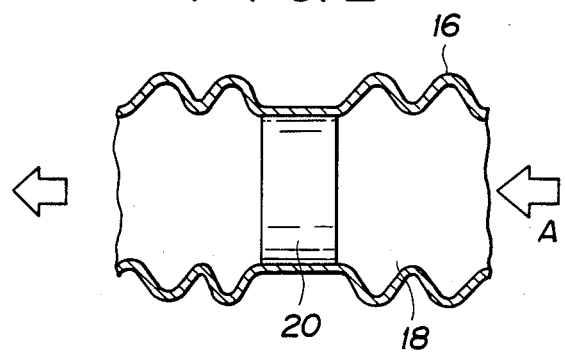
FIG. 2 is an enlarged cross-sectional view of the portion II in FIG. 1.
Figure 3:
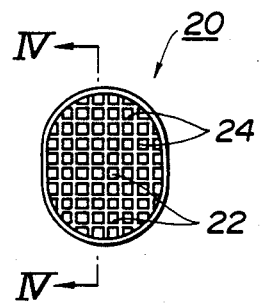
FIG. 3 is a front view of the rectifying unit.
Figure 4:
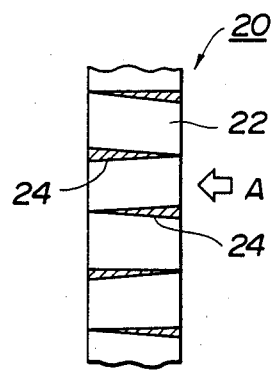
FIG. 4 is an enlarged view of the section IV—IV in FIG. 3.
Figure 5:
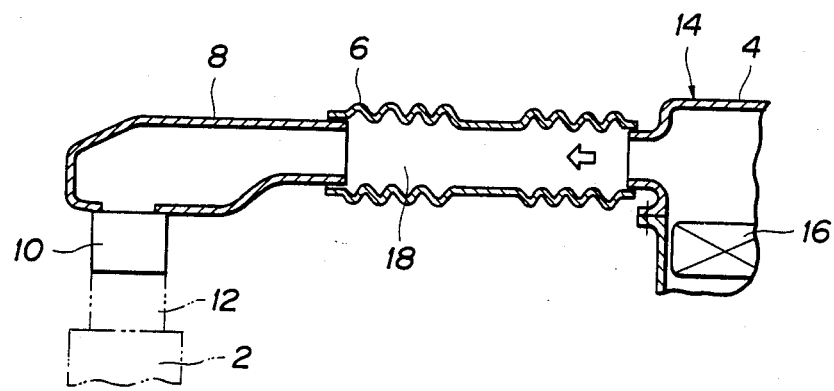
FIG. 5 is a cross-sectional view of a known vehicle suction system.

The filter element 16 is installed in the air cleaner case 14 of the air cleaner 4. The air taken into the air cleaner case 14 through the filter element 16 then passes through the passage 18 of the suction air duct 6, a component of the suction air passage, and is then mixed with fuel in the carburetor 10 to produce an air-fuel mixture which is supplied to each combustion chamber (not illustrated) of the internal combustion engine 2 through the intake manifold 12. The rectifying unit 20 shown in FIGS. 2 through 4 is installed in and extends across the suction air passage 18 of the suction air duct 6. The rectifying unit 20 may be affixed in the suction air duct by any suitable method such as being welded or bolted therein.

In the preferred embodiment, the rectifying unit 20 is located at the center of the suction air duct 6 and is provided with a plurality of generally parallel through-holes 22 extending along the suction air flow direction A, the holes 22 being formed by the partitions 24.

The through-holes 22 preferably have a square cross section in order to decrease the air suction resistance. To define the holes 22, in the preferred embodiment, the rectifying unit 20 includes a surrounding ring-like peripheral wall having a first series of generally vertically spaced partition wall 24 extending horizontally thereacross, and a second series of generally horizontally spaced partition walls extending vertically thereacross in generally perpendicular relationship to the horizontally-extending partition walls. These partition walls 24 hence in effect define a grid-like structure which in turn defines the plurality of square cross-section openings 22 extending therethrough along the flow direction in approximately parallel relationship with one another. Further, these partition walls 24, in the flow direction (that is, the axial direction of the flow passage) are themselves of significant axial extent or dimension and, as illustrated by FIG. 4, are preferably provided with a tapered cross section as they extend in the axial or flow direction.

More specifically, and referring to FIG. 4, the horizontally-elongate partitions 24 have a wedge-like cross section so as to have generally a sharp edge at one end and a generally flat end wall at the other end. The partitions thus have a substantial elongated triangular cross section. Further, the vertically adjacent ones of the horizontally. elongate partitions 24 are disposed with the wedge-like cross sections alternately reversely oriented as illustrated by FIG. 4. The vertically-elongate partition walls are formed and oriented in the same manner as the horizontal-elongate partitions illustrated by FIG. 4.

The following is a description of the present invention in operation:

When the internal combustion engine 2 is started, air taken into the air cleaner case 14 passes through the filter element 16 and then passes through the passage 18 of the suction air duct 6 into the suction air case 8. Then the air is mixed with fuel in the carburetor 10 to produce an air-fuel mixture which is supplied to each combustion chamber (not illustrated) of the internal combustion engine 2 by the intake manifold 12.

In the present invention, the pulsation and turbulence of the air taken into the air cleaner case 14 through the filter element 16 are rectified by the rectifying unit 20 installed in the suction air passage 18 of the suction air duct 6.

Because the rectifying unit 20 is provided with many square cross-sectional through-holes 22 along the suction air flow direction A, which holes are sidewardly separated by the partitions 24, the air suction resistance is decreased and the output of the internal combustion engine 2 is improved.

The rectifying unit 20 makes it possible to rectify the pulsation and turbulence of the suction air and inhibit air suction noises from being propagated back to the air cleaner by providing the rectifying unit with the plurality of through-holes 22 separated by the partitions 24 and forming the partitions so that they face the suction air flow direction (direction of the arrow A) and have wedge like cross sections which are alternatingly inversely oriented relative to the suction air flow direction. Therefore, it is possible to prevent the suction air duct 6 from vibrating due to the pulsation and turbulence of the suction air and to decrease noises inside and outside the vehicle.

In addition, the rectifying unit 20 can be installed in the suction air duct 6 without restriction to the installation direction because the partitions of the above through-holes 22 are formed so that they will have wedge-like cross sections alternatingly, inversely oriented to the suction air flow direction. This prevents the rectifying unit 20 from being installed incorrectly and makes it lightweight.

Thus, the device makes it possible to rectify the pulsation and turbulence of suction air, inhibit air suction noises from being propagated to the air cleaner, and assemble the rectifying unit with the suction-air-passage assembly without any restriction on the installation direction by providing the rectifying unit installed in the suction air passage in the suction-air-passage assembly with a plurality of through-holes along the suction air flow direction separated by the partitions and forming the partitions so that they face the suction air flow direction and have wedge-like cross sections alternatingly, inversely oriented to the suction air flow direction.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. A vehicle suction system having a rectifying unit installed in the suction air passage of the suction-air-passage assembly of an internal combustion engine for a vehicle, the rectifying unit having many through-holes along the suction air flow direction divided by partitions and the partitions having wedge-like cross sections which are alternately inversely oriented relative to the suction air flow direction.

2. In a suction system for supplying air to an internal combustion engine of a vehicle, said suction system extending between an air cleaner and a carburetor and including an air suction tube extending downstream from the air cleaner and defining therein an elongate suction air passage, the improvement comprising a rectifying device disposed within said air suction tube and extending transversely across said suction air passage for rectifying the pulsation and turbulence of the suction air flowing through the passage and for inhibiting propagation of noises back toward the air cleaner, said rectifying unit including a first plurality of generally parallel and sidewardly spaced partition walls rigidly joined to and extending perpendicularly relative to a second plurality of generally parallel and sidewardly spaced partition walls, said first and second pluralities of partition walls defining a generally grid-like structure through which extend a plurality of approximately parallel openings of generally square cross section, said openings all extending generally in the flow direction of said passage, said partition walls viewed in the downstream flow direction of the passage having a generally wedge-shaped cross section, and a partition walls of each of said first and second pluralities having the wedge-shaped cross sections thereof when viewed in a downstream direction alternately reversely oriented.

3. A system according to claim 2, wherein each of said pluralities of partitions have said wedge-like cross sections, and miriam the wedge-like cross section of each of said pluralities are alternately reversely oriented relative to the flow of direction.

4. A vehicle suction system comprising an air cleaner; a suction air case; a suction air duct communicating between and joining said air cleaner with said suction air case, said suction air duct comprising a suction air passage having a rectifying unit installed therein so that all air flow through said suction air passage is through a face of said rectifying unit, said rectifying unit comprising a plurality of wedge-shaped partition members separating a plurality of square-shaped holes, said plurality of wedge-shaped partition members being alternatingly, inversely disposed in said face of said rectifying unit; a carburetor provided on said suction air case; an internal combustion engine; and an intake manifold communicating between and joining said carburetor with said internal combustion engine.

* * * * *

UNITED STATES PATENT AND TRADEMARK OFFICE
CERTIFICATE OF CORRECTION

PATENT NO. : 4 889 081

DATED : December 26, 1989

INVENTOR(S) : Tadayuki OZAKI

It is certified that error appears in the above-identified patent and that said Letters Patent is hereby corrected as shown below:

Column 4, line 50; change "miriam" to ---wherein---.

Signed and Sealed this

Fourth Day of December, 1990

*Attest:*

HARRY F. MANBECK, JR.

*Attesting Officer*     *Commissioner of Patents and Trademarks*